US007343136B2

(12) United States Patent
Liu et al.

(10) Patent No.: US 7,343,136 B2
(45) Date of Patent: Mar. 11, 2008

(54) APPARATUS FOR DETECTING ENVIRONMENTAL CONDITIONS FOR A STRUCTURE OR ARTICLE

(75) Inventors: Chang Liu, Champaign, IL (US); Jonathan Engel, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 32 days.

(21) Appl. No.: 10/866,318

(22) Filed: Jun. 10, 2004

(65) Prior Publication Data

US 2005/0017873 A1    Jan. 27, 2005

Related U.S. Application Data

(60) Provisional application No. 60/477,634, filed on Jun. 11, 2003.

(51) Int. Cl.
*H04B 7/00*    (2006.01)
(52) U.S. Cl. .................. 455/66.1; 455/90.1; 455/67.11; 340/602; 340/539
(58) Field of Classification Search ........... 340/870.11, 340/870.01, 602, 539.1, 539.22, 539.24, 340/539.26, 539.28, 539.3, 540, 539; 455/423, 455/41.1, 41.2, 39, 67.11, 67.12, 67.7, 90.3, 455/90.1, 575.1, 575.8, 127.5, 128, 343.1, 455/344, 347, 426.2, 422.1, 414.1, 66.1, 455/67.14, 90.2
See application file for complete search history.

(56) References Cited

U.S. PATENT DOCUMENTS 4,611,171 A * 9/1986 Woods ....................... 324/253

| 6,836,578 | B2* | 12/2004 | Kochergin et al. ............. 385/12 |
| 2002/0049080 | A1* | 4/2002 | Thompson ............... 455/575.1 |
| 2002/0060631 | A1* | 5/2002 | Runge et al. ................ 340/602 |
| 2002/0180586 | A1* | 12/2002 | Kitson et al. .............. 340/5.82 |
| 2004/0100394 | A1* | 5/2004 | Hitt ....................... 340/870.11 |

OTHER PUBLICATIONS

Abidi, A.A., "Low-Power RF-ICs in Wireless Transceivers," IEEE Symposium on Low Power Electronics, 1994, pp. 18-21.
Akyildiz, I.F., Su, W., Sankarasubramaniam, Y., Cayirci, E., "A Survey on Sensor Networks," IEEE Communications Magazine, vol. 40, 2002, pp. 102-114.
Ayers, J., Zavracky, P.M., McGruener, N., Massa, D., Vorus, V., Mukherjee, R., Currie, S., 1998, "A Modular Behavioral-Based Architecture for Biomimetic Autonomous Underwater Robots," Proc. Autonomous Vehicles in Mine Countermeasures Symp., Naval Postgraduate School, CD ROM, http://www.cix.plym.ac.uk/cis/InsectRobotics/Biomimetics.htm, pp. 1-18.
Barnes, T.G., Truong, T.Q., Lu, X., McGruer, E., Adams, G.G., "Design, Analysis, Fabrication, And Testing of a MEMS Flow Sensor," 1999 ASME International Congress and Exposition on MEMS, vol. 1, 1999, pp. 355-361.

(Continued)

*Primary Examiner*—Duc M. Nguyen
*Assistant Examiner*—Fred Casca
(74) *Attorney, Agent, or Firm*—Greer, Burns & Crain, Ltd.

(57) ABSTRACT

An apparatus for detecting environmental conditions for a structure or article. The apparatus comprises one or more sensors for sensing conditions at the component or articles and producing one or more signals and a wireless transmitter for wirelessly transmitting data based on the one or more signals to a remote device.

19 Claims, 7 Drawing Sheets

OTHER PUBLICATIONS

Beebe, D.J., Hsieh, A.S., Denton, D.D., and Radwin, R.G., "A Silicon force Sensor for Robotics and Medicine," Sensors and Actuators, A 50, 1995, pp. 55-65.

Boillat, M.A., van der Wiel, A.J., Hoogerwerf, A.C., de Rooij, N.F., "A Differential Pressure Liquid Flow Sensor for Flow Regulation and dosing Systems," Proc. IEEE Micro Electro Mechanical Systems, 1995, pp. 350-352.

Chamberland, J.F., Veeravalli, V.V., "The Art of Sleeping in Wireless Sensing Systems," IEEE Workshop on Statistical Signal Processing, 2003, pp. 17-20.

Chandrakasan, A., R, A., Cho, S.H., Goodman, J., Konduri, G., Kulik, J., Rabiner, W., Wang, A., "Design Considerations for Distributed Microsensor Systems," IEEE Custom Integrated Circuits Conference, 1999.

Chen, J., Engel, J., Liu, C., "Development of Polymer-Based Artificial Haircell Using Surface Micromachining and 3D Assembly," 12th Intl. Conf. On Solid-State Sensors, Actuators and Microsystems, Boston, MA, 2003.

Chen, J., Fan, Z., Engel, J., Liu, C., "Towards Modular Integrated Sensors: The Development of Artificial Haircell Sensors Using Efficient Fabrication Methods," Proc. of the 2003 IEEE/RSJ Intl. Conf. On Intelligent Robots and Systems, Las Vegas, NV, Oct. 2003.

Chen, J., Fan, Z., Engel, J., Liu, C., "Two Dimensional Micromachined Flow Sensor Array for Fluid Mechanics Studies," ASCE Journal of Aerospace Engineering, Apr. 2003, pp. 85-97.

Chen, J., Liu, C., "Development and Characterization of Surface Micromachined, Out-of-Plane Hot-Wire Anemometer," Journal of Microelectromechanical Systems, vol. 12, No. 6, Dec. 2003, pp. 979-988.

Chen, J., Zou, J., Liu, C., "A Surface Micromachined, Out-of-Plane Anemometer," Proc of MEMS 02, Las Vegas, NV, 2002, pp. 332-335.

de Bree, H-H Jansen, H.V., Lammerink, T.S.J., Krijnen, G.J.M, Elwenspoek, m., 1999, "Bi-Directional Fast Flow Sensor with a Large Dynamic Range," J. Micromech. Microeng. 9 (1999), pp. 186-189.

Ebefors, T., Kalvesten, E., Stemme, G., "Three Dimensional Silicon Triple-Hot-Wire Anemometer Based on Polyimide Joints," Proc. 11th Annual Int. Workshop on Micro Electro Mechanical Systems: An Investigation of Micro Structures, Sensor, Actuators, Machines and Systems, Heidelberg, Germany, 1998, pp. 93-98.

Editor, "Touchy Touchy," the Economist, 2002, pp. 66-67.

Engel, J., Chen, J., Liu, C, "Development of a Multi-Modal, Flexible Tactile Sensing Skin Using Polymer Micromachining," 12th Intl. Conf. On Solid-State Sensors, Actuators and Microsystems, Boston, MA, 2003.

Engel, J., Chen, J., Liu, C, "Development of Polyimide Flexible Tactile Sensor Skin," Journal of Micromechanics and Microengineering, vol. 13, No. 9, 2003, pp. 359-366.

Engel, J., Fan, Z., Zhao, L., Chen, J., Liu, C., "Smart Brick—A Low Cost, Modular Wireless Sensor For Civil Structure Monitoring," Micro and Nanotechnology Laboratory, University of Illinois, Urbana, IL.

Enoksson, P., Stemme, G., Stemme, E., "A Coriolis Mass Flow Sensor Structure in Silicon," Proc. 9th Annual Int. Workshop on Micro Electro Mechanical Systems: An Investigation of Micro Structures, Sensors, Actuators, Machines and System, 1996, pp. 156-161.

Fan, Z., Chen, J., Zou, J., Bullen, D., Liu, C., and Delcomyn, F., "Design and Fabrication of Artificial Lateral Line Flow Sensors," Journal of Micromechanics and Microengineering, 12 (Sep. 2002), pp. 655-661.

Gray, B.L., Fearing, R.S., "A Surface Micromachined Microtactile Sensor Array," Proc 1996 IEEE Int'l Conf. On Robotics and Automation, Minneapolis, MN, 1996, pp. 1-6.

Jiang, F., Tai, Y.C., Ho, C.M., Rainer, K., and Garstenauer, M., Theoretical and Experimental Studies of Micromachined Hot-Wire Anemometer, Digest IEEE Int. Electron Devices Meetings (IEDM) (San Francisco), 1994, pp. 139-142.

Jiang, F., Tai, Y.C., Walsh, K., Tsao, T., Lee, G.B., Ho, C.M., "A Flexible MEMS Technology and its First Application to Shear Stress Sensor Skin," Proc 1997 IEEE Int'l Conf. On MEMS, pp. 465-470.

Kalvesten E., Vieider C., Lofdahl, L., Stemme, G., "An Integrated Pressure-Flow Sensor for Correlation Measurements in Turbulent Gas Flows," Sensors Actuators A 52, 1996, pp. 51-58.

Kane, B.J., Cutkosky, M.R., Kovacs, T.A., "A Traction Stress Sensor Array for Use in High-Resolution Robotic Tactile Imaging," Journal of MEMS, vol. 9, 2000, pp. 425-434.

Kolesar, E.S., Dyson, C.S., "Object Imaging with a Piezoelectric Robotic Tactile Sensor," Journal of MEMS, vol. 4, No. 2, 1995, pp. 87-96.

Lee, M.H., Nicholls, H.R., "Tactile Sensing for Mechatronics—a State of the Art Survey," Mechatronics, vol. 9, 1999, pp. 1-33.

Leineweber, M., Pelz, G., Schmidt, M., Kappert, H., Zimmer, G., "New Tactile Sensor Chip with Silicone Rubber Cover," Sensors and Actuators vol. 84, 2000, pp. 236-245.

Liu et al., "Polymer Micromachining and Applications in Sensors, Microfluidics, and Nanotechnology," 226th American Chemical Society National Meeting, New York, 2002.

Li, J., Fan. J., Chen, J., Zou, J, Liu, C., Delcomyn, F., "High Yield Microfabrication Process for Biomimetic Artificial Haircell Sensors," smart Electronics, MEMS, and Nanotechnology, Conference (Conference 4700), SPIE's 9th annual International Symposium on Smart Structures and Materials, Mar. 17-21, 2002, San Diego, CA.

Liu, C., Huang, J., Zhu, Z., Jiang, F., Tung, S., Tai, Y.C., Ho, C.M., "A Micromachined Flow Shear-Stress Sensor Based on Thermal Transfer Principles," IEEE/ASME Journal of Microelectromechanical Systems (JMEMS), vol. 8, No. 1, 1999, pp. 90-99.

Lofdahl, L., Kalvesten, E., Hadzianagnostakis, T., Stemme, G., "An Integrated Silicon Based Wall Pressure-Shear Stress Sensor for Measurements in Turbulent Flows," DSC-vol. 59, Proc. 1996 Int. Mechanical Engineering Congress and Exposition, New York, NY, 1996, pp. 245-251.

Lofdahl, L., Stemme, E., Stemme, G., 2001, "Silicon Based Flow Sensors Used for Mean Velocity and Turbulence Measurements," Exp. in Fluids, 12, 1992, pp. 270-276.

Martin, R., "Mother Knows Best: Imitating Nature is the Sincerest Form of Flattery," Forbes ASAP, 2002, pp. 26-29.

Ozaki, Y., Ohyama, T., Yasuda, T., Shimoyama, I., "An Air Flow Sensor Modeled on Wind Receptor Hairs of Insects," Proc. MEMS '00, Miyazaki, Japan, pp. 531-536.

Padmanabhan, A., Goldberg, H., Breuer, K.D., Schmidt, M.A., "A Wafer-Bonded Floating-Element Shear Stress Microsensor with Optical Position Sensing by Photodiodes," J. Microelectromech. Syst., vol. 5, No. 4, 1996, pp. 307-315.

Petersen, "Silicon as a Mechanical Material," Proc of the IEEE, vol. 70, No. 5, 1983, pp. 420-457.

Pfann, W.G., Thurston, R.N., "Semiconducting Stress Transducers Utilizing the Transverse and Shear Piezoresistance Effects," J. Appl., Phys. vol. 32, No. 10, 1961, pp. 2008-2009.

Rago, C., Willett, P., Bar-Shalom, Y., "Censoring Sensors: A Low-Communication Rate Scheme for Distributed Detection," IEEE Transactions on Aerospace and Electronics Systems, vol. 32, No. 2, 1996, pp. 554-568.

Reston, R.R., Kolesar, E.S., "Robotic Tactile Sensor Array Fabricated from a Piezoelectric Polyvinylidene Fluoride Film," Proc 1990 IEEE NAECON 3, pp. 1139-1144.

Richter, M., Wackerle, M., Woias, P., and Hillerich, B., 1999, "A Novel Flow Sensor with High Time Resolution Based on Differential Pressure Principle," Proc, 12 Int. Conf. On Micro Electro Mechanical Systems (Orlando, FL), pp. 118-123.

Shida, K., Yuji, J.I., "Discrimination of Material Property by Pressure-Conductive Rubber Sheet Sensor with Multi-Sensing Function," Proc 1996 IEEE Int'l Symp. On Industrial Electronics, vol. 1, pp. 54-59.

Shimizu, T., Shikida, M., Sato, K., Itoigawa, K., "A New Type of Tactile Sensor Detecting Contact Force and Hardness of an Object," Proc 2002 IEEE Int'l Conf. On MEMS, 2002, pp. 344-347.

Kloeppel, Jim, "Smart Bricks Could Monitoring Buildings, Save Lives," Inside Illinois, vol. 22, No. 22, 2003.

Su et al., "Characterization of a Highly Sensitive Ultra-Thin Piezoresistive Silicon, Cantilever Probe and its Application in Gas Flow Velocity Sensing," Journal of Micromechanics and Microengineering, vol. 12, 2002, pp. 780-785.

Sugiyama, S., Kawahata, K., Yneda, M., Igarashi, I, "Tactile Image Detection Using a 1K-Element Silicon Pressure Sensor Array," Sensors and Actuators A21-A23, 1990, pp. 397-400.

Svedin, N., Kalvesten, E., Stemme, E., Stemme, G., "A New Silicon Gas-flow Sensor Based on Lift Force," J. Microelectromech. Syst., vol. 7, No. 3, 1998, pp. 303-308.

Svedin, N., Stemme, E., Stemme G., "A Static Turbine Flow Meter with a Micromachined Silicon Torque Sensor," Technical Digest MEMS 2001: 14th IEEE Int. Conf. On Micro Electro Mechanical Systems (Interlaken, Switzerland), 2001, pp. 208-211.

Thaysen et al., "Polymer-based Stress Sensor with Integrated Readout," Journal of Physics D—Applied Physics, vol. 35, No. 21, Nov. 2002, pp. 2698-2703.

van Baar, J.J., Wiegerink, R.J., Iammerink, T.S.J., Krijnen, G.J.M., Elwenspoek, M., "Micromachined Structures for Thermal Measurements of Fluid and Flow Parameters," J. Micromech. Micoeng., 11, 2001, pp. 311-318.

van der Wiel, A.J., Linder, C., Rooij de, N.F., Bezinge, A., 1993, "A Liquid Velocity Sensor Based on the Hot-Wire Principle," Sensors Actuators, A37-A38, pp. 693-697.

van Honschoten, J.W., Krijnen, G.J.M., Svetovoy, V.B., de Bree, H-E, Elwenspoek, M.C., 2001, "Optimization of a Two Wire Thermal Sensor for Flow and Sound Measurements," Proc. 14th Int. Conf. Micro Electro Mechanical Systems (MEMS' 2001), pp. 523-526.

Wang, X., Engel, J., Chen, J., Liu, C., "Liquid Crystal Polymer Based MEMS Applications," Journal of Micromechanics and Microengineering, vol. 13, May 2003, pp. 628-633.

Warneke, B., Atwood, B., Pister, K.S.J., "Smart Dust Mote Forerunners," IEEE International Conference on MEMS, 2001, pp. 357-360.

Xu, Y., Jiang, F., Lin, Q., Clendenen, J., Tung, S., and Tai, Y.C., 2002, "Under Water Shear Stress Sensor," MEMS '02: 15th IEEE Int. Conf. On Micro Electro Mechanical Systems, Las Vegas, NV, 2002, pp. 340-343.

Zou, Jun Chen, L., Liu, C., Schutte-aine, J., "Plastic Deformation Magnetic Assembly (PDMA) of Out-of-Plane Microstructures: Technology and Application," Journal of Microelectromechanical Systems, vol. 10, No. 2, 2001, pp. 302-309.

* cited by examiner

APPARATUS FOR DETECTING ENVIRONMENTAL CONDITIONS FOR A STRUCTURE OR ARTICLE

PRIORITY CLAIM

This application claims the benefit of U.S. Provisional Application Ser. No. 60/477,634, filed Jun. 11, 2003, under 35 U.S.C. § 119.

STATEMENT OF GOVERNMENT INTEREST

This invention was made with Government assistance under National Science Foundation Grant No. NSF IIS-0080639. The Government has certain rights in the invention.

FIELD OF THE INVENTION

The present invention relates generally to sensors.

BACKGROUND OF THE INVENTION

It would be desirable to detect environmental conditions for articles, such as structures or objects, so that these conditions could be recorded, analyzed, reported, and/or addressed. This is particularly true where it would be difficult or impossible for humans to detect such conditions directly.

It has been contemplated to provide artificial sensors for such environmental detection. However, in many situations, due to space or other limitations, hazardous environments, etc., it has been impractical to use these sensors to detect environmental conditions directly. This precludes receiving environmental data from some locations where such data would be beneficial.

SUMMARY OF THE INVENTION

Embodiments of the present invention provide an apparatus for detecting environmental conditions for a structure or article. The apparatus comprises one or more sensors for sensing conditions at the component or articles and producing one or more signals and a wireless transmitter for wirelessly transmitting data based on the one or more signals to a remote device. A network for detecting environmental conditions for a structure or article is also provided.

DETAILED DESCRIPTION

Figure 1:
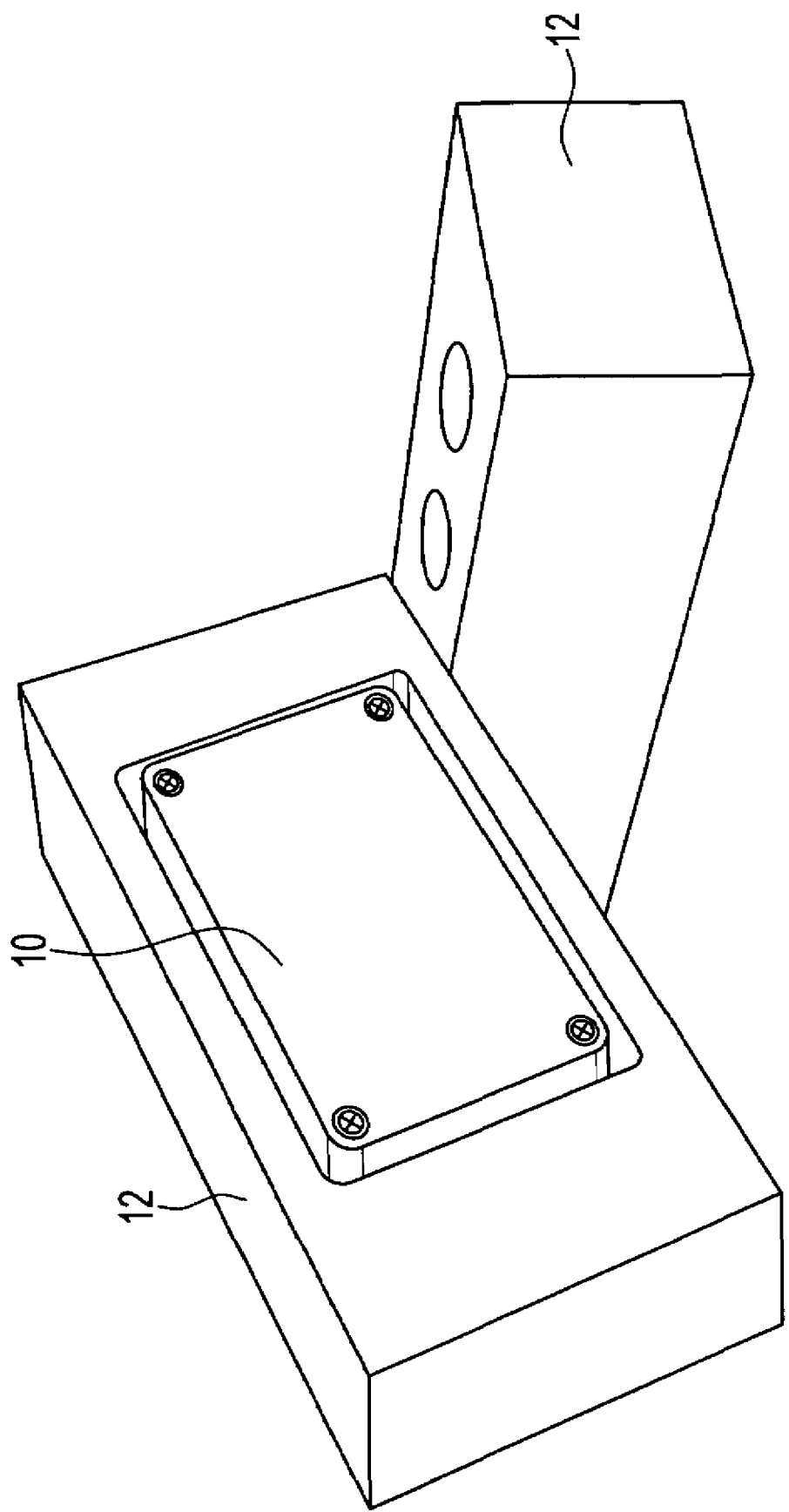
FIG. 1 shows an outside of a structural component containing a sensor node, according to an embodiment of the present invention.

One method of detecting environmental conditions in locations where humans would be unable to do so directly is to provide artificial sensors. These sensors may include any of various sensors suitable for detecting environmental conditions.

According to embodiments of the present invention, an individual sensor package is provided, which includes one or more sensors, plus signal processors for receiving and processing the signals from the sensors. The sensor package may also record, store, or analyze data and/or address detected environmental conditions based on the data to some degree. However, to minimize size and power consumption for a sensor package, it is preferred that an outside (i.e., remote) device linked to the sensor package be used to accomplish one or more of these tasks. For example, a configuration in a preferred embodiment may include the sensors, an analog-digital converter, a power source, a multiplexer, a wireless transmitter, and an antenna. A preferred sensor package thus detects environmental conditions, and transmits data relating to these conditions to an outside device for additional processing and/or storage.

According to preferred embodiments of the present invention, if multiple sensor packages are used, for example, to monitor different locations or environmental aspects, each sensor package represents one of a plurality of sensor nodes in a network. The sensor nodes are connected to one or more centralized hubs. The hubs may receive and collect transmitted data from the sensor nodes, and may perform one or more of the functions described above, or the hub may itself communicate with another hub or a centralized base for performing these functions. For example, one or more hubs may operate as a signal router. Alternatively, the sensor nodes may communicate with the base directly. Sensor nodes in particular embodiments may communicate with one another.

If an outside device is used, the sensors need to be able to communicate with the device. This can be done using transmission paths that are wired or wireless. While wired transmission of data may be feasible in some environments, it is often impractical or impossible to do so.

Wireless sensing nodes may be manufactured to create networks for gathering data from distributed sources where wiring would be too difficult, dangerous, or expensive to implement. This allows the sensor nodes to be placed at a source of environmental changes, or a location where environmental effects may be influential, so that relevant and accurate environmental data can be received and collected for outside storage, analysis, compensation, etc.

In an extreme case, the sensor nodes may be distributed on a large scale (e.g., in the millions) over a wide area, while maintaining a high spatial density so that node-to-node damage tolerant ad-hoc networking is enabled. For example, simple, inexpensive sensor nodes may be used for monitoring soil conditions for agriculture or toxic agent levels on a battlefield.

For other applications, more complex, and preferably fewer, sensor nodes can be used that incorporate a flexible array of sensors. In this case, more powerful transmission methods can reduce the sensor node density, which may be beneficial for effective data collection. The number of sensor nodes can be selected to balance the transmission power requirements of particular sensor nodes.

In a preferred embodiment of the present invention, a wireless sensor or sensor node is incorporated into an article or into a component of a structure. A structure, for example, may include a civil structure or other structure. A preferred sensor node combines sensor fusion, signal processing, and wireless technology into a multi-modal package that can report environmental conditions to an outside location.

An exemplary sensor node is incorporated into construction material so that the sensor node can be placed more easily in a location where environmental effects can be detected. For example, a modular sensor node may be incorporated into a building component as a part of a network, providing a "smart" building. In the context of building materials, "smart" indicates that through onsite monitoring of environmental parameters such as one or more of force, stress, temperature, tilt, moisture, etc., the simple building blocks that make up modern structures may be enabled to provide long-term intelligence regarding their health, and the health of their surrounding environment.

As other examples, a sensor-node can be embedded into a fabric of an article of clothing, integrated with belts or fasteners, and/or incorporated into a furniture structure or within batting. The structural component may also include, for example, a human or artificial limb. Small, multimodal sensor nodes attached to patients or embedded in clothing can provide un-tethered monitoring of patients for efficient on-site or responsive home-based health care.

The structure can be on a large scale, such as a civil structure, or may be an article on a significantly smaller scale, such as a toy. The health and status of civil structures, for example, may be monitored using sensor nodes for scheduling routine maintenance or to assist in emergencies. Such civil structures may include, for example, skyscrapers, bridges, houses, roads, pavements, etc. Structures also may include construction or pavement materials, for example.

Previous sensor devices or systems in civil structures were difficult to implement because the sensors were connected through fixed wires. This introduces significant difficulty for construction and maintenance. As a result, such sensor embodiments are rarely practiced.

Further exemplary applications include monitoring nurseries, daycares and senior homes, and creating interactive "smart toys" that respond to the touch of a child. In a smart doll, for example, sensor capability may be used to distinguish, between caressing and slapping, allowing the doll to react accordingly. In the gaming industry, wireless sensors attached to a person's arms and legs could replace the conventional joystick for controlling, for example, a screen icon or avatar.

Figure 2:
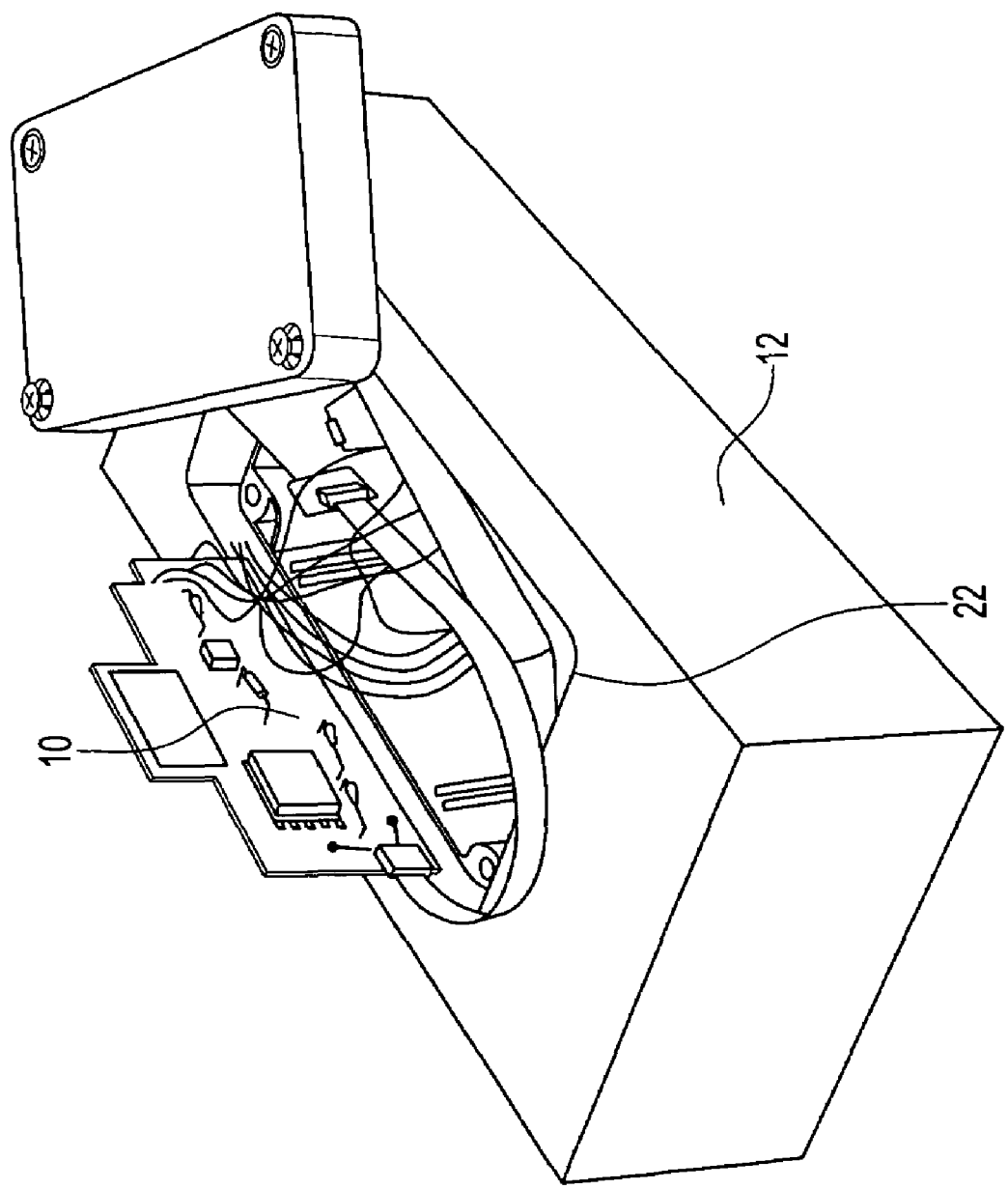
FIG. 2 shows the inside of the structural component of FIG. 1, including the sensor node.

Referring now to the drawings, FIGS. 1 and 2 shows a sensor node 10 incorporated into a structural component 12, which in the illustrated example is embodied in a brick. Preferably, the sensor node 10 is contained within the structural component 12 or otherwise does not significantly protrude from the structural component. This allows the structural component 12 with the sensor node 10 to be incorporated more easily into a larger structure, for example a building.

Figure 3:
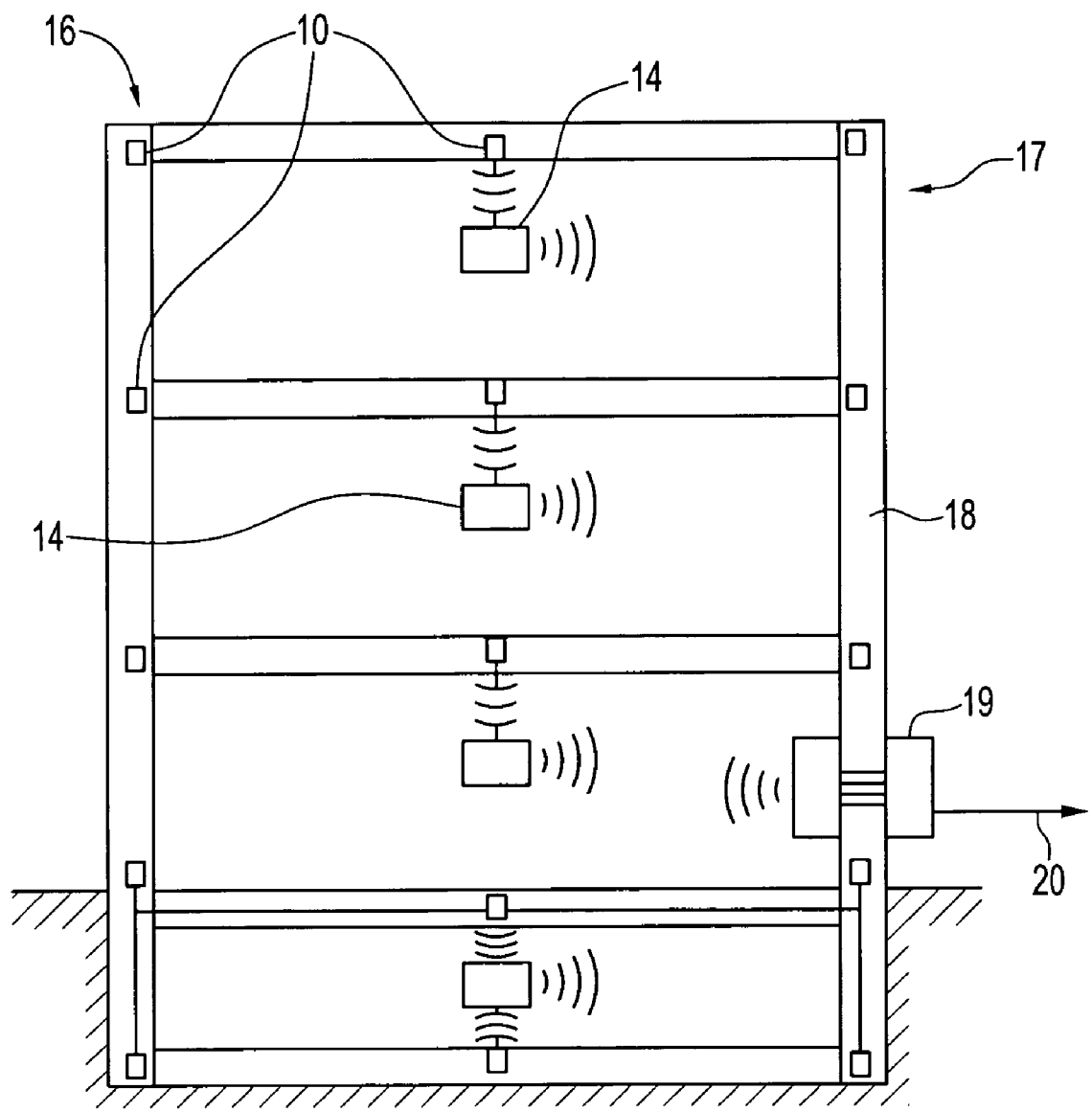
FIG. 3 shows a building incorporating a network for detecting environmental conditions, according to an embodiment of the present invention.

Several structural components 12 containing the sensor nodes 10 may be placed inside or formed with a building. The sensor nodes 10 preferably communicate with one or more central hubs 14 (see FIG. 3) that collect data from the sensor nodes. The hubs 14 may be mounted to any of various locations within a building or article. The sensor nodes 10 and the hubs 14 form a structural network 16 for a building 17, shown by example in FIG. 3. In FIG. 3, the sensor nodes 10 are contained within concrete 18, forming a structure (i.e., walls, floors, and foundation) of the building 17.

In the exemplary structural network 16 shown, the hubs 14 communicate with a centralized base 19, for access and processing. The structural network 16, for example via the centralized base 19, in turn, may communicate with emergency workers, building operators, residences, or people through an interface 20, such as land telephone lines, Internet access, and/or wireless networks. Though it is possible that the sensor node 10 may communicate with the hub 14 via transmission lines, in which case the hub preferably communicates wirelessly with the base 19, it is more preferred that the sensor node communicate wirelessly with the hub. It is preferred that the sensor node 10 is a self-contained device, which communicates with the hub 14 and/or the base 19. In a preferred embodiment, the hub 14 is placed to receive a constant source of power, and thus preferably has a higher transmission power and range than the sensor node 10. In this way, the sensor nodes 10 can have a reduced range, since the hub 14 may be located within its range. Alternatively, the sensor node 10 may communicate directly with the base 19.

Instead of building components, the sensor nodes 10 can be packaged and placed inside construction materials for structures such as bridges, pavements, or roadways, for example. The sensor nodes 10 may be further integrated and packaged into clothing or accessories to be portable and wearable.

The sensor node 10 is preferably disposed within a chamber 22 of the structural component 12, as shown in FIG. 2. The chamber 22 can be manufactured by subtractive methods, for example by machining (e.g., carving) the structural component 12, and/or by additive methods, such as by pouring concrete around the sensor node 10 or a housing containing the sensor node. The structural component 12, and the housing if present, should permit transmission of wireless signals between the sensor node and an outer device, such as the hub 14.

Various structural components 12, including a brick as shown in FIG. 1, permit such wireless transmission. As other examples, the sensor node 10 could be integrated in concrete blocks, laminated beams, structural steel, and many other building materials. Additive and subtractive methods for incorporating the sensor node 10 into the structural component 12 can vary, but in particular uses the methods may be limited by, for example, size constraints, structural concerns, etc.

Figure 4:
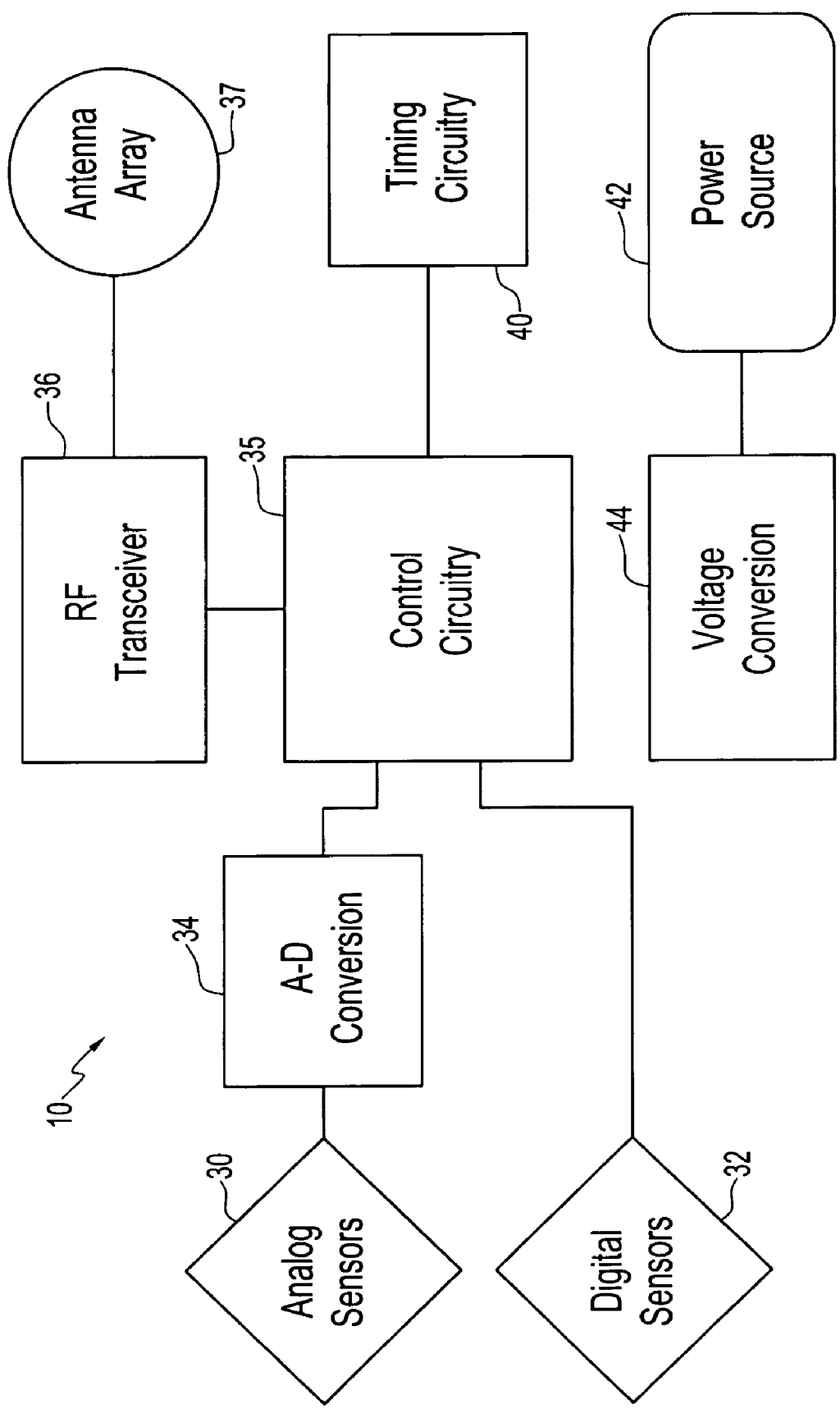
FIG. 4 shows components of a preferred sensor node.

Referring now to FIG. 4, components of a preferred sensor node 10 include: one or more sensors, for example digital and analog sensors 30, 32, for detecting environmental conditions around the structural component 12; an analog-to-digital converter 34 for converting signals from the analog sensors; control circuitry 35, for processing the signals from the sensors and producing a data stream, and may also decide what data if any will be transmitted, and/or take action based on commands from the hub 14 or the base 19, initiate a sleep mode, etc.; a radio-frequency (RF) transmitter 36 and an antenna 37, such as an antenna array for sending the data stream or receiving commands; timing circuitry 40, for timing the control circuit and/or the A-D converter; and a power source 42, for example with a voltage converter 44, providing power to the sensor node. It is preferred to minimize the number of the components and/or the power consumption of the individual components to minimize the overall power needed by the sensor node 10. Thus, the overall configuration preferably should be made to be as simple and efficient as possible. For example, a sensor node including primarily the sensors, the analog-digital converter, the power source, a multiplexer, a wireless transmitter, and an antenna, may be used as a simplified component. Other considerations, such as space considerations, may be important for containing the sensor node 10 within particular structural components 12.

The sensors 30, 32 may include any suitable sensor for detecting environmental effects. For example, the sensors 30, 32 may include, but are not limited to one-axis vibration sensors, two-axis vibration sensors, three-axis vibration sensors, temperature sensors, multiple temperature sensors, moisture sensors, humidity sensors, chemical sensors, and acoustic sensors. In an exemplary embodiment, the sensor node 10 incorporates a pair of Analog Devices ADXL202AE 2 g dual-axis accelerometers for three-dimensional vibration and tilt sensing, and a standard 10 k thermistor for temperature detection. However, the type and number of sensors are flexible.

In the preferred sensor node 10, one or more of the sensors 30, 32 are micro-scale sensors to reduce space and power requirements. The digital sensor 32, for example, may include an analog sensor with an analog-digital layer. Alternatively, or additionally the digital sensor 32 may include, for example, an accelerometer producing a digital pulse width modulation encoding, a thermal breaker switch, a water sensor that conducts when wet, a failure switch that indicates a structural breach, or other type of sensor. In another embodiment, no sensors having digital output are used, but instead the analog sensors 30 and the analog-digital converter 34 are used to produce signals.

Figure 5:
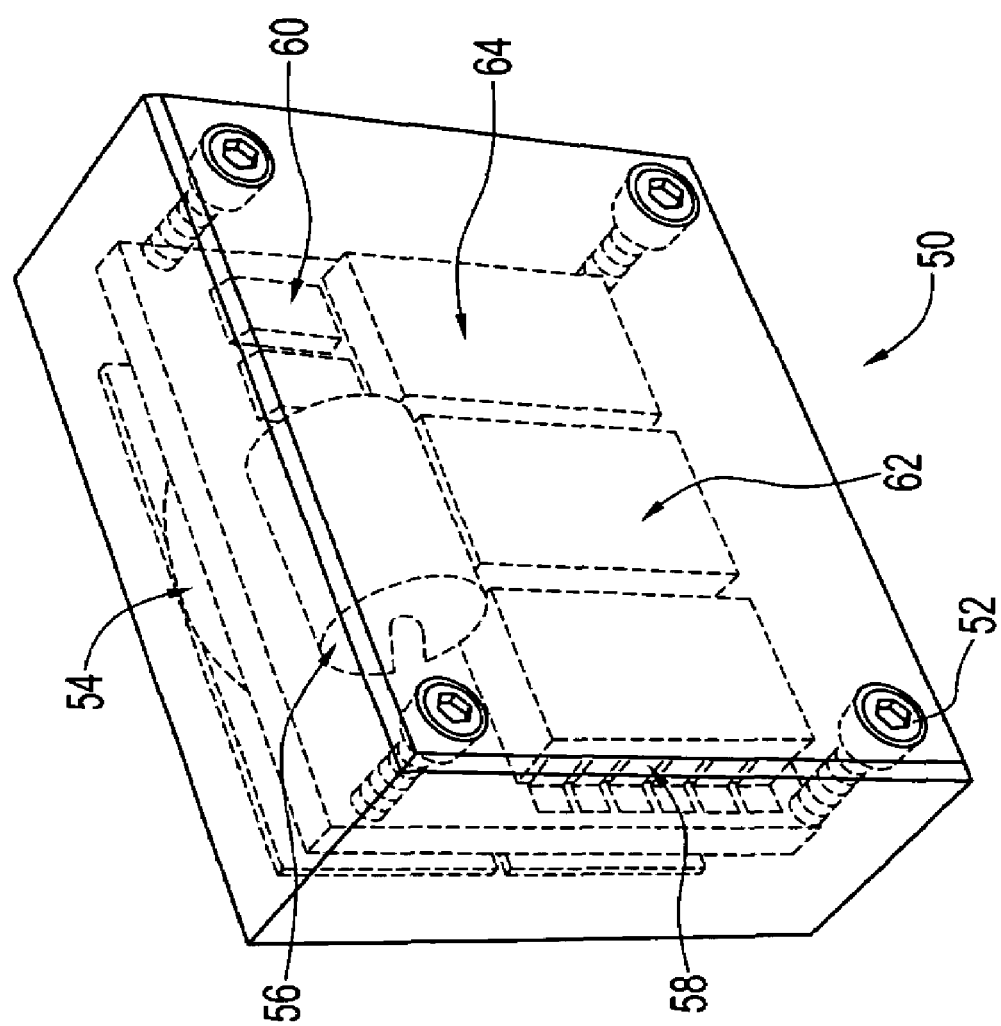
FIG. 5 shows another sensor node, according to an embodiment of the present invention.

For example, one or more of the sensors 30, 32 may be microelectromechanical systems (MEMS) devices. Such sensors may include, for example, sensors to measure acceleration, rotation, angle with respect to gravity, temperature, humidity, chemical concentrations of gases, composite of chemical solutions, magnetic fields or others. The MEMS sensors may be, for example, integrated onto a die of the circuits of the sensor node 10. For example, FIG. 5 shows an alternative sensor node 50, including a housing 52 surrounding a battery 54, an antenna 56, an RF transceiver 58, one or more MEMS sensors 60, a multiplexing control 62, and a signal processor 64.

If the structural component 12, such as a brick, is added into a wall of the building 17, for example, the structural component may be configured to monitor a building's temperature, vibration and movement, and other aspects of the building's health. Such information could be important to emergency workers, for example, or for rescue workers ascertaining the soundness of an earthquake-damaged structure.

As another example, if the sensor node 10, 50 is cast into a brick as shown in FIG. 1 or in a masonry block, for example, the sensor node may be used in fire curtain walls found in stairwells to send information regarding the safety of building exits during a fire. The sensor node 10, 50 may include tilt and acceleration sensors, which provide structural damage data, while temperature sensors indicate areas of active burn or unsafe areas for exit due to a compromised fire curtain. Such data collected from a distributed network of the sensor nodes 10, 50 in a large building may dramatically increase the safety of occupants as well as emergency crews.

The control circuitry 35 preferably contains components suitable for receiving signals from the sensors 30, 32, processing the signals as necessary, and sending data to the hub 14 or another outer device. If the sensor node 10, 50 includes multiple sensors, the control circuitry 35 may contain, for example, a multiplexer (as in the multiplexing control 62) to accept sensor signals from multiple sensors in a parallel or serial fashion. Signals from the analog sensor 30 may be digitized by the analog-to-digital converter 34 to reduce susceptibility to noise. In a preferred embodiment, processing the signals from the sensors 30, 32 includes amplifying analog output signals, digitizing them, and using the digitized signal to modulate radio frequency transmission.

The signal representing the data is sent by the RF transceiver 36 and the antenna 37 through an established protocol between the sensor unit 10, 50 and the hub 14 or the base 19, which are remote reading stations. Preferably, the control circuitry 35 of the sensor node 10, 50 combines the data from each channel (e.g., sensors for multiple accelerometer axes and temperature) and time multiplexes the data for transmission, with each "channel" receiving equal transmission time regardless of data content. This preferred approach does not include any request-to-send handshaking, data headers, or error correction in an effort to maintain system simplicity and avoid node-side processing overhead and thus unnecessary power consumption. However, it is contemplated that one or more of these features may be implemented by the sensor node 10, 50.

In a preferred embodiment, the sensor node 10, 50 uses a minimum of components for analog-to-digital conversion, and the control circuitry 35 includes a minimum number of components for sensor sampling, signal multiplexing (if necessary), and data transmission. For example, to maintain system simplicity, one or more of clock synchronization, time-stamping, and error correction functions may be omitted in the sensor node 10, 50. Though one or more of these components may be incorporated into the sensor node 10, 50, it is preferred that software in the hub 14 or other outer device implements the necessary processing and data fusion. In this way, the preferred sensor node 10, 50 relies on much simpler protocols and electronics to decrease power consumption and cost. The control circuit 35 may include programmable logic devices or microcontrollers, for example for controlling one or more functions of the sensor node.

The RF transceiver 36, with the antenna 37, sends data to the hub 14 or other outer device, and may receive commands for controlling functions of the sensor node 10, 35. The antenna 37 may be, for example, an array of directional antennas and/or a multidirectional antenna. Wireless communication links, for example operating at 10 MHz and above, can be integrated into the package. Preferred frequency ranges include 900 MHz-1 GHz, 1-2 GHz, and above, if desired. In a preferred embodiment, the antenna 37 is tunable to focus on specific spatial directions. In this way, the antenna 37 senses a location of receiver units, such as those in the hub 14 or the base 19, and adjusts its broadcasting pattern to target the receivers rather than broadcasting with uniformly distributed intensity through the three-dimensional space. This helps save energy associated with communication.

In another embodiment, to save energy required for transmission, the sensor nodes 10 may communicate with one or more other sensor nodes. The signals may then be transmitted to the hub 14 or the base 19.

An exemplary sensor node utilizes the unlicensed 915 MHz industrial, scientific, and medical (ISM) applications band, as well as a compact helical canister antenna. The sensor node may, for example, also utilize an off-the-shelf stand-alone FM/FSK (Frequency Modulated/Frequency Shift Keyed) radio with integrated discrete components. Alternatively, a microprocessor controlled unit may be used to make the RF transceiver 36 smaller and more efficient.

The power source 42 may include, for example, long-lasting batteries with high integration density. For example, the batteries may be designed to last months to years. Rechargeable batteries may be used, provided suitable control is used for charging the batteries. Alternatively, the power source 42 may include inductive coils and rechargeable storage devices such as batteries (or capacitors) that allow such storage devices to be charged from outside of the structural component inductively. In another embodiment, one or more faces of the structural component 12 may contain solar cells facing the outside of a building for charging a storage device and/or for supplying power. In yet another alternative, a storage device may be charged through a device that uses vibration, such as a vibration-based generator, or a thermal-based charging device such as a Peltier junction, present in the structural component 12. Other power sources, storage devices and/or charging devices are possible.

An important concern of wireless sensor design is power consumption. Reduced power needs for wireless sensing nodes extends service lifetime and expands capabilities. To optimize such applications, it may be advantageous to formulate efficient protocols specialized to wireless sensor network needs, provide circuits that harvest power from the environment, and/or build relatively small and efficient sensor nodes 10, 50. Other approaches include specialized ASIC mixed signal integration to reduce size as well as current consumption. By incorporating low power programmable logic into the sensor node 10, 50, extensive component count and power savings can be achieved.

To extend battery life, the sensor node 10, 50 could transmit building conditions to the hub at regular intervals, instead of operating continuously. Another exemplary method of reducing power implements sensor node "sleeping". In this way, the sensor node 10, 50 uses on-board processing to predict future measurements and will turn itself off for a period of time based on this prediction.

Figure 6:
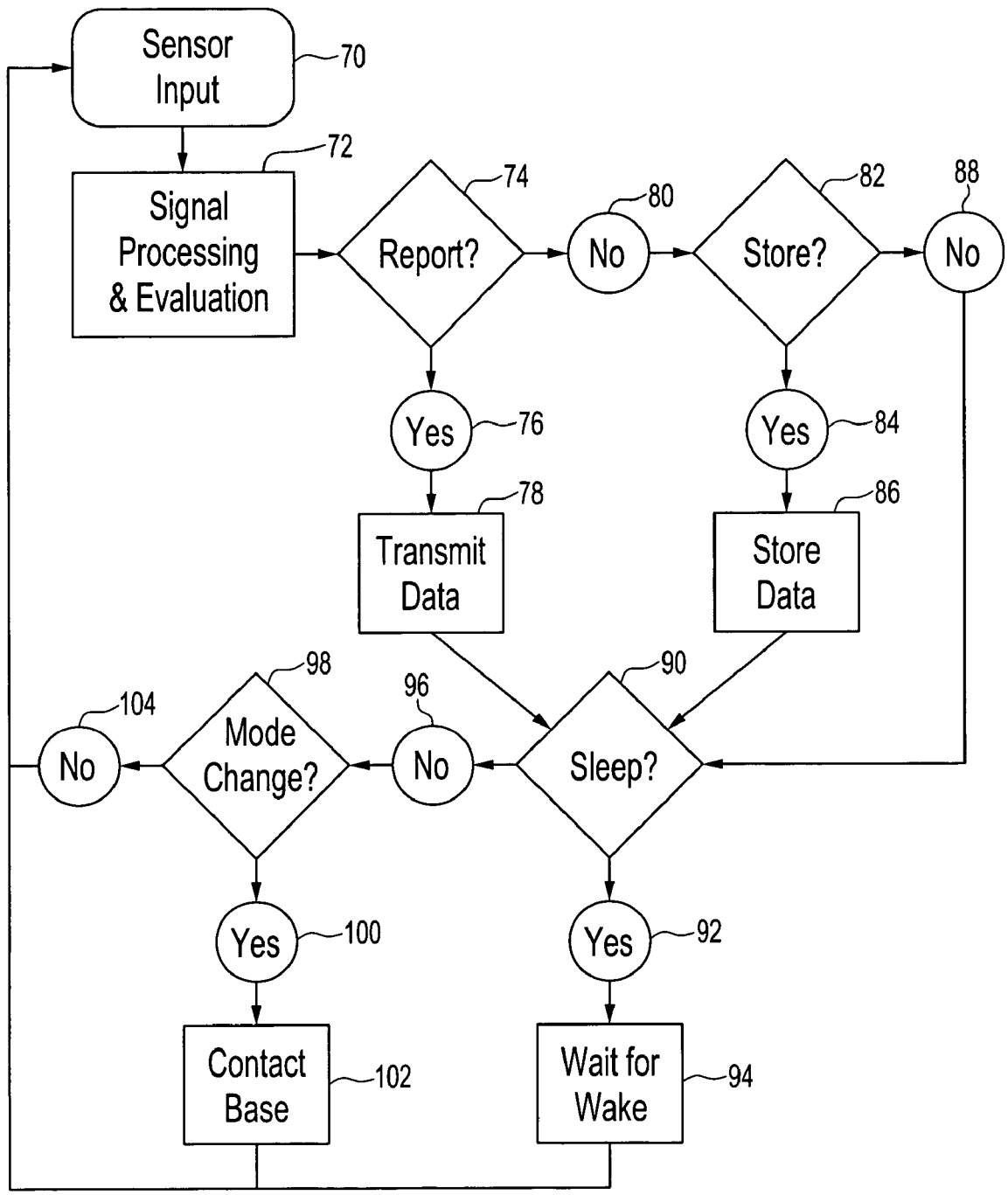
FIG. 6 shows an operation for a control circuit of a sensor node, according to an embodiment of the present invention.

FIG. 6 shows an exemplary operation flow for the sensor node 10, 50 incorporating a sleep mode. In a sample cycle, a sensor input 70 is received from one of the sensors 30, 32, which may be converted to a digital signal. The signal is processed and evaluated 72. For example, data concerning environmental conditions may be extracted from the processed signal. The control circuit 35 queries 74 whether the data is to be reported. If the sensor node 10, 50 is configured (e.g., programmed) to report the data 76, the data is transmitted 78 to the hub 14 via the RF transmitter 36 and the antenna 37. If not (step 80), the control circuit 35 then queries 82 whether the data instead is to be stored, and if so (step 84), stores 86 the data, for example, within a suitable non-volatile storage device.

After the data is transmitted 78, stored 86, or neither transmitted nor stored (step 88), the control circuit then queries 90 whether the sensor node is to enter a sleep mode. If so (step 92), sleep mode is entered 94, and the sensor node 10, 50 waits for a signal to wake, which may be at a particular time, after a particular time interval, or upon receipt of an outside signal. As stated above, the decision as to whether the sensor node 10, 50 is to enter sleep mode and/or the amount of time in which the sensor node is to sleep may be determined through a predictor of future measurements or optimal sensing times or intervals incorporated into the control circuitry. Once awakened, the sensor node 10, 50 receives (step 70) a new signal input from the sensor 30, 32.

If the sensor node 10, 50 is not set to enter sleep mode (step 96), either at that time or at all, the sensor node then queries 98 as to whether a mode change is in order. This may occur, for example. The mode change state preferably represents a portion of a control code that is flexible and based on instructions from the base 19, the hub 14, or internal code. Based on these, the sensor node 10 may transmit a system status report (i.e., battery life, signal strength, number of receivers in communication range, etc.), may change from normal operation to an emergency "full sleep" mode to conserve a failing power source, change to full report mode when all data is immediately transmitted, etc. If the mode is to be changed (step 100), the sensor node contacts the hub 14 or the base 19 (step 102). If not (step 104), the sensor node 10, 50 receives a new signal input from the sensor 30, 32.

The sensor nodes 10, 50 communicate with the hub 14, which in an exemplary embodiment includes a wireless receiver board. An exemplary hub uses a ¼ wave dipole antenna. The hub 14 may be coupled to a computer, such as a PC, with a suitable connection, such as but not limited to an RS-232 cable. Alternatively, the hub 14 may operate as a router, which routes a received signal to the base 19 for processing, analysis, storage, etc. The base 19 may also include a wireless receiver board, or may communicate via transmission lines. The base 19 preferably is coupled to a computer such as a PC, for processing a received data stream or streams.

Figure 7:
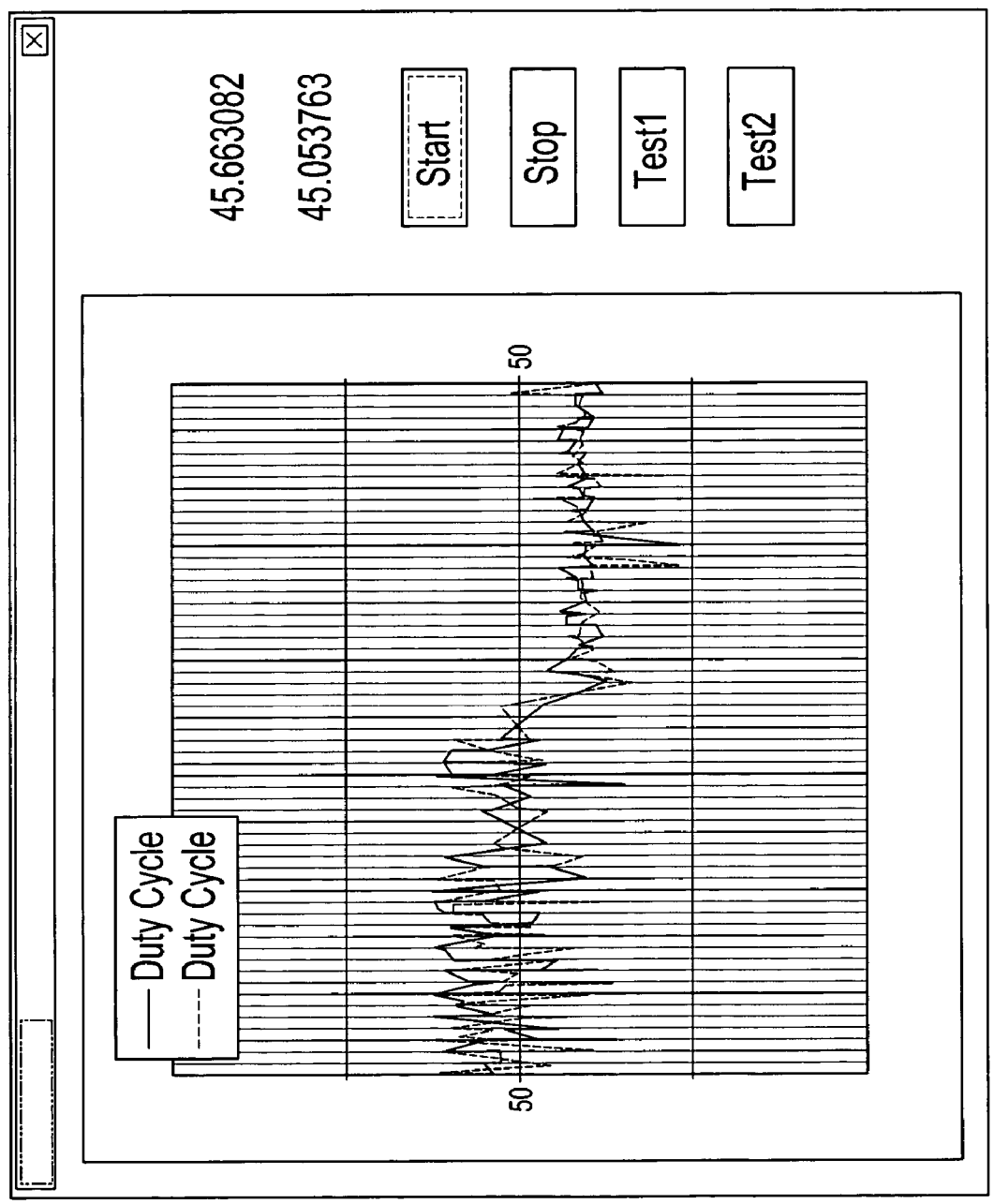
FIG. 7 shows a data collection with traces of x- and y-axis acceleration measurements transmitted from a sensor node to a wireless receiver, according to an embodiment of the present invention.

In a preferred embodiment, the coupled PC runs a software data fusion program that decodes the incoming data stream or streams and analyzes the streams for recording, reporting, compensation of environmental effects, etc. In an exemplary embodiment, the data streams from a sensor node having a temperature sensor and a two-axis vibration sensor are displayed onto the various axes of acceleration and temperature. FIG. 7 shows an operation of exemplary real-time data collection, tracking x and y-axis acceleration of the sensor node 10, 50.

Tests conducted by the present inventors show that analog data can be reliably sampled, multiplexed with the other data channels, and converted to a serial data stream, received, and reconstructed into an analog waveform via software. The signals transmitted from an exemplary sensor node are capable of reaching a wireless receiver, if the wireless receiver is within a suitable distance, even when the sensor node is incorporated into structural components. A suitable sampling frequency by the hub or the base allows the waveform to be regenerated by the hub or the base after it is received, with acceptable fidelity. For most building-scale applications, for example, detection of inputs (vibration, temperature change, humidity change, stress, etc) with frequencies above 100 Hz should not be required, though it is contemplated that testing frequencies above and below 100 Hz may be used.

In some embodiments, available, "off-the-shelf" components or articles may be used for components of the sensor node 10, 50. However, it is preferred that all components fits onto a single chip.

Those skilled in the art will appreciate that various apparatuses, systems, and methods have been provided for environmental detection using sensors and wireless communication, incorporated into a structural component or other article. Use of wireless communication allows the sensors to be located where otherwise it may be difficult or impossible to monitor environmental conditions. Various embodiments provide ways to reduce the size of a particular sensor package and/or to reduce required power consumption of the sensor package.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the present invention are set forth in the appended claims.

What is claimed is:

1. An apparatus for detecting environmental conditions for an architectural structure comprising:
   one or more sensors for sensing conditions at the architectural structure and producing one or more signals;
   a wireless transmitter for wirelessly transmitting data based on the one or more signals to a remote device; and
   a power source for at least one of said one or more sensors and said wireless transmitter;
   wherein said one or more sensors, said wireless transmitter, and said power source are contained within a structural component of the architectural structure;
   wherein the structural component is incorporated within the architectural structure to form a combined uniform structure.

2. The apparatus of claim 1 wherein the sensors comprise at least one of a vibration sensor and a tilt sensor.

3. The apparatus of claim 1, wherein said power source comprises at least one of a storage device and a charging device.

4. The apparatus of claim 3 further comprising:
   control circuitry for controlling receiving of signals from the one or more sensors and for controlling sending of data through the wireless transmitter.

5. The apparatus of claim 4 wherein said control circuitry is programmed to receive signals from the one or more sensors at regular intervals.

6. The apparatus of claim 4 wherein said control circuitry is programmed to enter a sleep mode.

7. The apparatus of claim 6 wherein said control circuitry is programmed to enter a sleep mode based on a prediction of signals from the one or more sensors.

8. The apparatus of claim 1 wherein the one or more sensors and the wireless transmitter are enclosed within a chamber of the structural component.

9. A structural component incorporating the apparatus of claim 1.

10. An apparatus for detecting environmental conditions for an architectural structure comprising:
    one or more sensors for sensing conditions at the architectural structure and producing one or more signals;
    a wireless transmitter for wirelessly transmitting data based on the one or more signals to a remote device; and
    a power source for at least one of said one or more sensors and said wireless transmitter;
    wherein said one or more sensors, said wireless transmitter, and said power source are contained within a structural component of the architectural structure, and
    wherein the structural component is incorporated within the architectural structure to form a combined uniform structure;
    wherein the structural component comprises at least one of a masonry brick, a concrete brick, poured concrete, and structural steel, and wherein the architectural structure comprises a building.

11. An apparatus for detecting environmental conditions for an architectural structure comprising:
    one or more sensors for sensing conditions at the architectural structure and producing one or more signals;
    a wireless transmitter for wirelessly transmitting data based on the one or more signals to a remote device; and
    a power source for at least one of said one or more sensors and said wireless transmitter;
    wherein said one or more sensors, said wireless transmitter, and said power source are contained within a structural component of the architectural structure, and wherein the structural component is incorporated within the architectural structure to form a combined uniform structure;
    wherein the structural component comprises at least one of poured concrete and asphalt,
    and wherein the architectural structure comprises at least one of a building, a bridge, a road, and a pavement.

12. A network for detecting environmental conditions within an architectural structure, the network comprising:
    a sensor node comprising at least one sensor, a wireless transmitter, and a power source for the at least one sensor and the wireless transmitter;
    at least one hub for receiving wired or wireless signal transmitted from said sensor node;
    wherein said sensor node is contained within a structural component of the architectural structure;
    wherein the structural component is incorporated within the architectural structure to form a combined uniform structure;
       wherein the at least one sensor senses at least one condition at the architectural structure and produces one or more signals; and
       wherein the wireless transmitter transmits data to said at least one hub based on the produced one or more signals.

13. The network of claim 12 further comprising:
    a base in communication with said at least one hub for receiving signals sent from said at least one hub.

14. The network of claim 13 further comprising: a computer coupled to at least one of said base and said at least one hub.

15. A method of detecting environmental conditions in an architectural structure, the method comprising:
    providing a signal from at least one sensor disposed within a structural component of the architectural structure, wherein the structural component is incorporated within the architectural structure to form a combined uniform structure;
    processing the signal to provide a data stream; wirelessly transmitting the data stream to a remote device;
    receiving the wireless transmitted data stream;
    wherein a wireless transmitter for providing said wirelessly transmitting and a power source are contained within the structural component;
    wherein said provided signal is based on a sensed environmental condition.

16. The method of claim 15 wherein said processing the signal comprises:
    multiplexing the signal from the at least one sensor;
    converting the multiplexed signal to a serial data stream.

17. An apparatus for detecting environmental conditions for an architectural structure comprising:
    a brick;
    one or more sensors for sensing conditions at the architectural structure and producing one or more signals;
    a wireless transmitter for wirelessly transmitting data based on the one or more signals to a remote device; and a power source for at least one of said one or more sensors and said wireless transmitter;

wherein said one or more sensors, said wireless transmitter, and said power source are contained within the brick.

18. The apparatus of claim 17 wherein the sensors comprise at least one of a thermistor, a vibration sensor, a moisture sensor, a chemical sensor, and an acoustic sensor.

19. The apparatus of claim 17 further comprising: control circuitry for controlling receiving of signals from the one or more sensors and for controlling sending of data through the wireless transmitter.

* * * * *